United States Patent

Schwientek

[11] Patent Number: 5,896,963
[45] Date of Patent: Apr. 27, 1999

[54] SYSTEM FOR PARTIALLY ENGAGING AND DISENGAGING A SERVO CLUTCH SO AS TO IMPART ROTATION FOR ASSISTING A REVERSE SHIFT

[75] Inventor: Christian Schwientek, Weinsberg, Germany

[73] Assignee: Robert Bosch GmbH, Stuttgart, Germany

[21] Appl. No.: 08/881,461

[22] Filed: Jun. 24, 1997

[30] Foreign Application Priority Data

Jun. 28, 1996 [DE] Germany ............................. 19625967

[51] Int. Cl.$^6$ .............................. F16D 23/06; F16H 3/38; B60K 41/22
[52] U.S. Cl. ...................... 192/3.62; 192/3.63; 477/180; 74/336 R; 74/339
[58] Field of Search .................................. 192/3.58, 3.62, 192/3.63, 21, 82 P; 74/335, 336 R, 339; 477/166, 180, 70

[56] References Cited

U.S. PATENT DOCUMENTS

| | | | |
|---|---|---|---|
| 4,601,369 | 7/1986 | Hattori et al. | 192/3.62 X |
| 4,662,494 | 5/1987 | Wakiya et al. | 477/83 |
| 4,765,450 | 8/1988 | Kurihara | 192/3.62 X |
| 4,981,202 | 1/1991 | Leigh-Monstevens et al. | 192/3.56 X |
| 5,377,797 | 1/1995 | Mustapha et al. | 192/3.62 X |
| 5,488,878 | 2/1996 | Manz | 192/3.63 X |

*Primary Examiner*—Khoi Q. Ta
*Attorney, Agent, or Firm*—Walter Ottesen

[57] ABSTRACT

The invention is directed to a system for controlling a servo clutch which is mounted between the motor of a vehicle and a transmission having at least one reverse gear which can be set. To set the reverse gear, at least two rotatable transmission parts are brought into meshing engagement with each other. To set the reverse gear, the servo clutch is driven in such a manner that a rotational movement is imparted to at least one of the transmission parts. With this system, the reverse gear can be set reliably and comfortably especially in automated manual-shift transmissions.

17 Claims, 2 Drawing Sheets

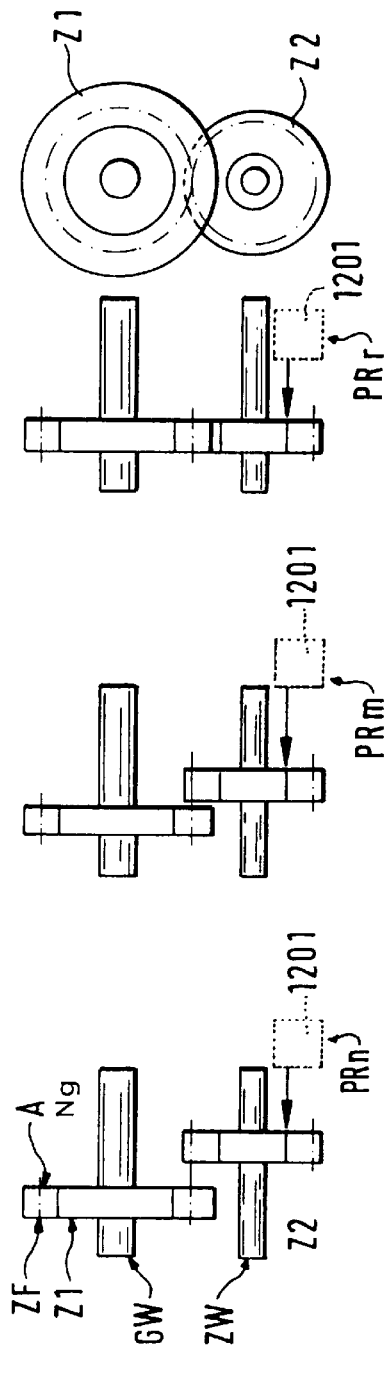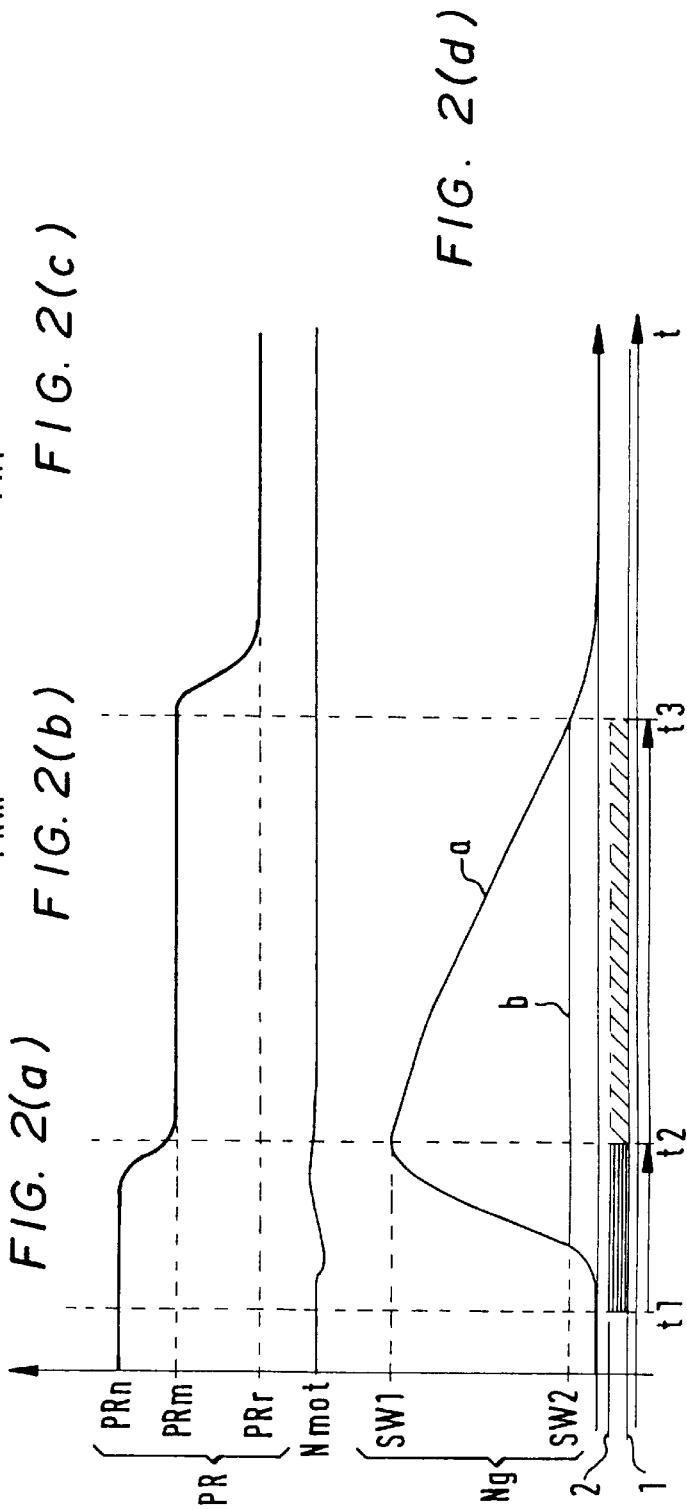

SYSTEM FOR PARTIALLY ENGAGING AND DISENGAGING A SERVO CLUTCH SO AS TO IMPART ROTATION FOR ASSISTING A REVERSE SHIFT

FIELD OF THE INVENTION

The invention relates to a system for controlling a servo clutch which is mounted between a vehicle motor and a transmission which has at least one reverse gear. At least two rotatable transmission parts are brought into an interengaging state in order to effect a shift into the reverse gear.

BACKGROUND OF THE INVENTION

Automatic clutches or automatic servo clutches of this kind are disclosed, for example, in the text entitled "Kraftfahrtechnisches Taschenbuch" of Robert Bosch GmbH (1991), pages 538 and 539. Servo clutches provide a cost-effective fully automatic transmission in combination with electronic control apparatus and especially in combination with servo actuated manual transmissions. In such servo clutches, the opening and closing of the clutch is generally performed by a servo drive.

In conventional shift transmissions, the reverse gear is generally neither synchronized nor in continuous engagement. Furthermore, the reverse gear is configured with straight-toothed gear wheels. For this reason, problems can occur when shifting into the reverse gear when the tooth flanks of the gear wheels, which are allocated to the reverse gear, directly abut each other. A shift into the reverse gear cannot take place if this is the case.

SUMMARY OF THE INVENTION

It is an object of the invention to provide a system wherein the reverse gear can be reliably and comfortably set in every situation and such that the gears are subjected to minimum wear.

The system of the invention is for controlling a servo clutch in a motor vehicle and includes: a motor of the vehicle; a transmission having at least one reverse gear into which the transmission can be shifted; the servo clutch being mounted between the motor and the transmission; the transmission including first and second rotatable transmission parts which can be brought into engagement with each other for shifting into the reverse gear; and, means for driving the servo clutch to impart a rotational movement to at least one of the transmission parts thereby facilitating a shift of the transmission into the reverse gear.

As mentioned, the invention proceeds from a system of controlling a servo clutch which is mounted between a vehicle motor and a transmission. The transmission has at least one reverse gear which can be set. At least two rotatable gear parts must be brought into meshing engagement with each other in order to shift into the reverse gear. The essence of the invention is that, for shifting into the reverse gear, the servo clutch is driven in such a manner that a rotational movement is imparted to at least one of the transmission parts.

With the system of the invention, a shifting into the reverse gear can take place in a manner which is reliable, comfortable and so that the transmission is subjected to minimum wear. This is so because the above-mentioned static mutual abutment of the tooth flanks cannot occur. This relates also to setting the reverse gear under extreme conditions (for example, at low temperature and when the vehicle is on an inclined surface). With the invention, the reverse gear can even be set while subjecting the transmission to minimum wear, for example, when the vehicle engine is held at a high rpm level during idle and the reverse gear is set.

In an advantageous embodiment of the invention, the system provides for the opening and closing of the servo clutch by moving a first actuating element in and out in a manner known per se. The first actuating element is controlled by control means. The transmission then has a second actuating element which is controlled by the control means. With this second actuating element, at least two rotatable gear wheels functioning as transmission parts are brought into a meshing state in order to set a reverse gear. The control apparatus of the invention is so configured that the first actuating element is driven in such a manner that a rotational movement is imparted to at least one of the gear wheels shortly before meshing thereof.

According to a feature of the invention, this rotational movement can be achieved by driving the servo clutch in such a manner that the servo clutch is driven in a sense of at least a partial closing of the clutch before setting the reverse gear in response to a signal which represents a desired shift into the reverse gear. For this purpose, the above-mentioned control unit can be configured in such a manner that the first actuating element is driven before setting the reverse gear in the sense of at least a partial closing of the clutch in response to a signal which represents a desired setting of the reverse gear. The signal which represents a desired setting of the reverse gear is generally initiated directly by the driver.

After this at least partial closing of the clutch referred to directly above, another embodiment of the invention provides for a further step in which the servo clutch is driven in the sense of at least a partial opening of the clutch. For this purpose, the above-mentioned control unit can be configured in such a manner that the first actuating element is driven in a sense of at least a partial opening of the clutch after at least a partial closing of the clutch.

It is especially advantageous that the servo clutch is driven in dependence upon a detected transmission rpm. The transmission rpm represents especially the rotational movement of one of the transmission parts (gear wheels) via which the reverse gear is realized. For this purpose, the control unit is configured in such a manner that the first actuating element is driven in dependence upon the detected transmission rpm. This configuration affords the advantage that the rpm behavior of the engaging gear wheel can be adjusted very precisely by closing and/or opening the servo clutch. In this way, the condition can be achieved that one of the gear wheels is rotated with a low rotational speed at the time point of meshing (that is, when the gear is actually set). Even in the most unfavorable case, when the tooth flanks are opposite each other, the mutually abutting tooth flanks slide off each other and thereby make possible a reliable and comfortable setting of the reverse gear without significant wear to the gears.

In a further embodiment, the servo clutch is driven in the sense of at least a partial closing of the clutch in such a manner that the transmission rpm is set to a pregiven first value or is adjusted to reach a pregiven first threshold value. For this purpose, the control unit is configured in such a manner that the first actuating element is driven to adjust the transmission rpm to a pregiven first value or to reach a pregiven first threshold value.

The subsequent opening of the clutch can then be undertaken to adjust the transmission rpm to a pregiven second value or to reach a pregiven second threshold value. For this purpose, the control unit is configured in such a manner that the actuating element is driven in a further step to set the transmission rpm to a pregiven second value or to reach a pregiven second threshold value.

In contrast to the above-described rpm-dependent driving of the servo clutch, the drive (or drives) of the servo clutch can be time controlled. The control unit is then correspondingly configured. This embodiment of the invention affords the advantage that the transmission rpm does not have to be detected.

In an especially advantageous embodiment of the invention, the servo clutch is driven to adjust a pregiven and an especially low value of the transmission rpm. The control unit is correspondingly configured. Here, it is especially considered that the transmission rpm is controlled to a pregiven and especially low third value by driving the servo clutch. A precondition of this configuration is that the rpm data is already reliably available even for relatively low rpms. For this purpose, a Hall sensor can be used for detecting rpm. In this case, the clutch slippage (for example, in the sense of a control of the transmission rpm to the low value) can be adjusted in such a manner that the engaging gear wheel has a specific low rpm. If this rpm is adjusted, then the reverse gear can be set without difficulty because, as mentioned above, the mutual abutment of the tooth flanks is prevented.

BRIEF DESCRIPTION OF THE DRAWINGS

The invention will now be described with reference to the drawing wherein.

DESCRIPTION OF THE PREFERRED EMBODIMENT OF THE INVENTION

Figure 1:
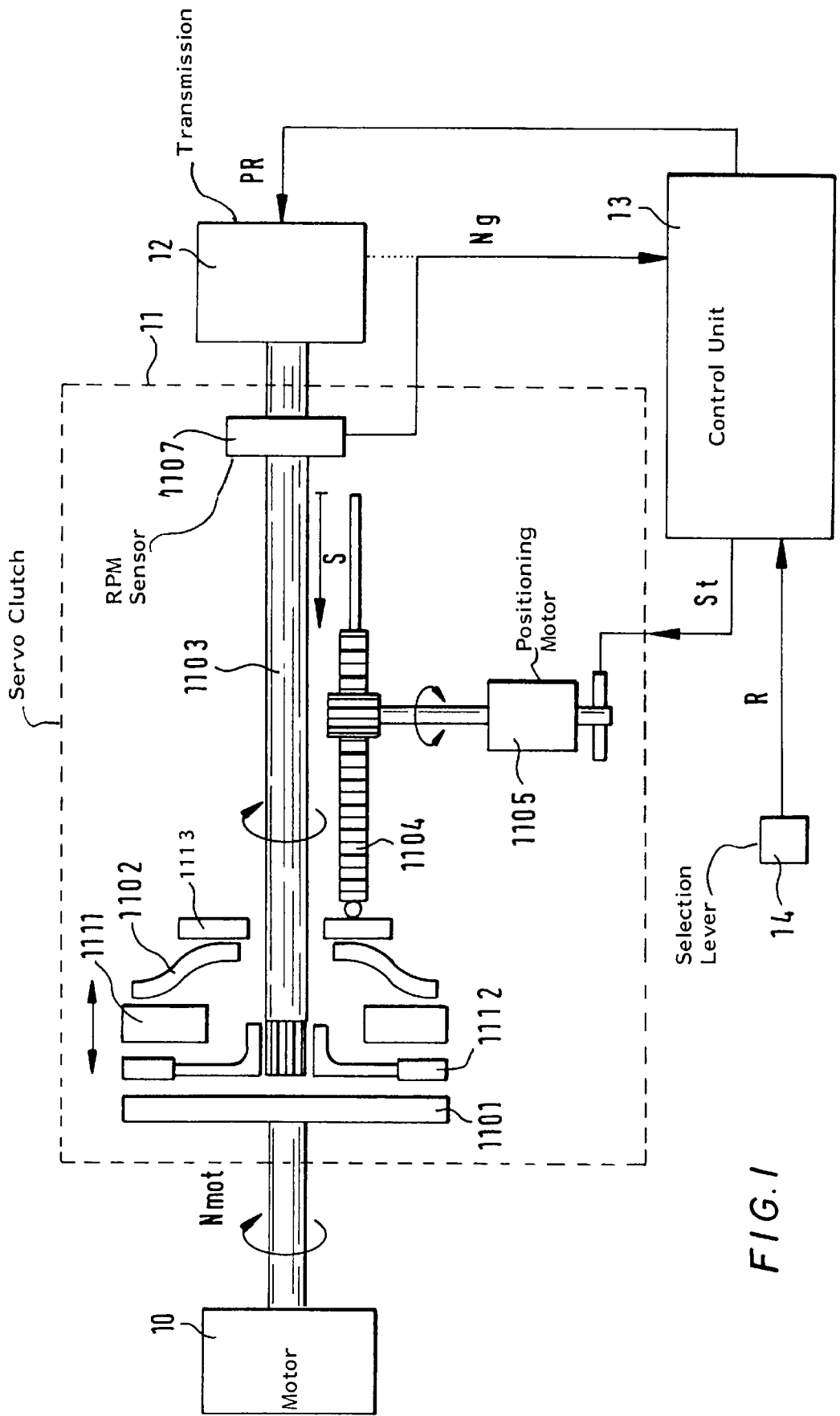
FIG. 1 is a schematic showing the system according to the invention in the form of a block diagram; and, FIG. 2 shows one possible time-dependent sequence of the procedure performed by the system of the invention.

In FIG. 1, a vehicle motor 10 has an output shaft which is connected to the disc flywheel 1101 of the servo clutch 11. At the output end, the servo clutch 11 leads to the transmission 12.

The signal R is supplied to the control unit 13 and is the output signal of the selection lever 14 which can be actuated by the driver. The signal R indicates whether setting of the reverse gear is wanted. Furthermore, the signal Ng is applied to the control unit 13 and indicates the rpm of a gear wheel (Z1 in FIG. 2) of the transmission 12, the gear wheel Z1 being assigned to the reverse gear. For the sake of simplicity, the output rpm of the servo clutch 11 is detected by the rpm sensor 1107 and is taken as the transmission rpm Ng in FIG. 1. The transmission rpm can, however, also be detected in the transmission 12 itself.

Additional signals (such as the motor load and the longitudinal speed of the vehicle) are supplied to the control unit 13 in order to determine the transmission gear ratio. This is not shown in FIG. 1.

The clutch is equipped in a manner known per se with a flywheel 1101, a clutch-driven plate 1112, a pressure plate 1111, a spring element (plate spring) 1102 and the clutch-release bearing 1113. The torque is transmitted by the clutch in a slipping operation. This torque or clutch torque is given, inter alia, by the pretensioning of the plate spring 1102. The pretensioning of the plate spring 1102 is, in turn, dependent upon the engaging path S of the clutch linkage which is configured as a gear rack 1104 in this embodiment. The gear rack 1104 is actuated by the output shaft of the positioning motor 1105.

FIG. 2 relates to the operations in the transmission 12 and in the servo clutch 11. In the upper part of FIG. 2, the gear wheels Z1 and Z2, which are assigned to the reverse gear, are shown in different adjustable positions and in two different views. For example, reference character A represents the chamfering on the gear wheel Z1 and reference character ZF indicates the tooth flank. Furthermore, the transmission shaft GW and the intermediate shaft ZW are shown. The positioning of the two gear wheels Z1 and Z2 relative to each other takes place by driving the electromechanical actuating element 1201 with an electrical drive signal PR. The actuating element 1201 is mounted in transmission 12 (FIG. 1).

In the upper left-hand portion of FIG. 2, the neutral position of the gear wheels Z1 and Z2 is shown (drive signal PRn applied to the actuating element 1201). In the upper center portion of FIG. 2, the center position (drive signal PRm of the actuating element 1201) is shown and in the upper right-hand portion of FIG. 2, the reverse gear position (drive signal PRr of the actuating element 1201) is shown. In the reverse gear position, the reverse gear is completely engaged and the gear wheels Z1 and Z2 are in meshing engagement with each other.

In the lower portion of FIG. 2, the time-dependent trace of the positions (1, 2) of the servo clutch are shown: the transmission rpm Ng, the engine rpm Nmot and the drive signals PR.

For a vehicle motor which is running, and while in the neutral position PRn, the command R to engage the reverse gear is given at time point t1. A force-locked engagement is realized briefly in reaction to the signal R via a corresponding drive St of the servo clutch (at least a partial closing of the clutch). The clutch then goes from the state 1 (no force-locked engagement) to state 2 (force-locked engagement). The motor rpm Nmot drops by an insignificant amount.

The force-locked engagement of the clutch is maintained until the transmission rpm Ng (for example, the rpm of the gear wheel Z1 of transmission 12) reaches the upper threshold value SW1 at time point t2 or exceeds this threshold value (trace a). The gear wheel Z2 is moved into the center position (drive signal PRm) in the time span between time points t1 and t2. This can, however, take place only at time point t2. The clutch is driven (drive St) so that it again assumes the state 1 (no force-locking engagement). The transmission rpm Ng drops because of the inertia of the transmission until the transmission rpm reaches or drops below the lower threshold value SW2 at time point t3 (trace a). At time point t3, the transmission shaft GW still rotates with the low rpm SW2 so that, for a complete engagement of the reverse gear (drive signal PRr) at this time point, the problem does not occur that the tooth flanks ZF of the gear wheels Z1 and Z2 abut each other and therefor do not permit the reverse gear to be set. Because of the slight rotation, the tooth flanks ZF of the gear wheels Z1 and Z2 slide on each other so that the reverse gear can be set.

In the embodiment described, the time points t2 and t3 are determined by comparisons of the transmission rpm Ng with the threshold values SW1 and SW2. Alternatively, the time points t2 and t3 can be selected in a time-controlled manner. For this embodiment, the transmission rpm is not needed.

In a further embodiment of the invention, the force-locked engagement at the clutch is adjusted in reaction to the command R (set the reverse gear) in such a manner that the transmission rpm is set or controlled to the lower threshold value SW2 (trace b). This is characterized in the lower portion of the sequence shown in FIG. 2 in that the clutch assumes the state 2 (force-locking engagement) up to time point t3. In this embodiment, the complete setting of the reverse gear (PRr) can take place in a specific rpm band without the transmission rpm Ng exceeding a threshold value SW2 as in the first variation. This configuration assumes that the rpm Ng is reliably available even at relatively low rpms. For this purpose, a Hall sensor, for example, can be used to detect rpm.

It is understood that the foregoing description is that of the preferred embodiments of the invention and that various changes and modifications may be made thereto without departing from the spirit and scope of the invention as defined in the appended claims.

What is claimed is:

1. A system for controlling a servo clutch in a motor vehicle, the system comprising:
   a motor of the vehicle;
   a transmission having at least one reverse gear into which the transmission can be shifted;
   said servo clutch being mounted between said motor and said transmission;
   said transmission including first and second rotatable transmission parts which can be brought into engagement with each other for shifting into said reverse gear;
   means for driving said servo clutch to impart a rotational movement to at least one of said transmission parts thereby facilitating a shift of said transmission into said reverse gear;
   means for generating a signal (R) representing a wanted shift into said reverse gear;
   said driving means defining a drive of said servo clutch which is so configured that, in response to said signal (R), said servo clutch is so driver to at least partially engage said servo clutch in advance of shifting into said reverse gear; and,
   said drive is so configured that, after the at least partial closing of said servo clutch, said servo clutch is driven to effect at least a partial opening of said servo clutch.

2. A system for controlling a servo clutch in a motor vehicle, the system comprising:
   a motor of the vehicle;
   a transmission having at least one reverse gear into which the transmission can be shifted;
   said servo clutch being mounted between said motor and said transmission;
   said transmission including first and second rotatable transmission parts which can be brought into engagement with each other for shifting into said reverse gear;
   means for driving said servo clutch to impart a rotational movement to at least one of said transmission parts thereby facilitating a shift of said transmission into said reverse gear;
   means for detecting the rpm (Ng) of said transmission; and,
   said driving means defining a drive of said servo clutch which drives said servo clutch in dependence upon the detected rpm (Ng) of said transmission.

3. The system of claim 2, wherein said drive is adapted to adjust said rpm (Ng) of said transmission to a pregiven first value (Ng1) or to reach a pregiven threshold value (SW1).

4. The system of claim 1, wherein said drive, in a further step, is adapted to adjust said transmission rpm (Ng) to a pregiven second value (Ng2) or to reach a pregiven second threshold (SW2).

5. The system of claim 1, wherein said drive of said servo clutch and/or said drive of said servo clutch, in a further step, is time controlled.

6. The system of claim 2, wherein said drive of said servo clutch takes place to adjust a pregiven low value (Ng3) of said transmission rpm.

7. The system of claim 2, wherein said drive of said servo clutch takes place to control said transmission rpm (Ng) to a pregiven low value (Ng3).

8. A system for controlling a servo clutch in a motor vehicle, the system comprising:
   a motor of the vehicle;
   a transmission having at least one reverse gear into which the transmission can be shifted;
   said servo clutch being mounted between said motor and said transmission;
   said servo clutch including a clutch mechanism mounted between said motor and said transmission for opening and closing a connection between said motor and said transmission;
   a first actuator for operating on said clutch mechanism to disengage and engage said clutch mechanism;
   said transmission including first and second rotatable gear wheels movable relative to each other into a state wherein said first and second gear wheels are mutually engaged;
   a second actuator operatively connected to said gear wheels so as to bring said gear wheels into meshing engagement with each other to facilitate shifting into said reverse gear; and,
   control means for controlling said first actuator and said second actuator and said control means being adapted to drive said first actuator to impart a rotational movement to one of said gear wheels shortly before said gear wheels are brought into said meshing engagement.

9. The system of claim 8, further comprising:
   means for generating a signal (R) representing a wanted shift into said reverse gear; and,
   said control means being so configured that, in response to said signal (R), said first actuator is driven to at least partially engage said clutch mechanism in advance or shifting into said reverse gear.

10. The system of claim 9, wherein said control means is so configured that, after the at least partial closing of said clutch mechanism, said clutch mechanism is driven to effect at least a partial opening of said clutch mechanism.

11. A system for controlling a servo clutch in a motor vehicle, the system comprising:
   a motor of the vehicle;
   a transmission having at least one reverse gear into which the transmission can be shifted;
   said servo clutch being mounted between said motor and said transmission;
   said servo clutch including a clutch mechanism mounted between said moor and said transmission for opening and closing a connection between said rotor and said transmission;
   a first actuator for operating on said clutch mechanism to disengage and engage said clutch mechanism;
   said transmission including first and second rotatable gear wheels movable relative to each other into a state wherein said first and second gear wheels are mutually engaged;

a second actuator operatively connected to said gear wheels so as to bring said near wheels into meshing engagement with each other to facilitate shifting into said reverse gear;

control means for controlling said first actuator and said second actuator and said control means being adapted to drive said first actuator to impart a rotational movement to one of said sear wheels shortly before said gear wheels are brought into said meshing engagement;

means for detecting the rpm (Ng) of said transmission; and, said control means being so configured that said first actuator is driven in dependence upon said rpm (Ng) of said transmission.

12. The system of claim 11, wherein said rpm (Ng) of said transmission is the rpm of said first gear wheel; and, said second actuator is adapted to act on said second gear wheel.

13. The system of claim 10, wherein said control means is configured to drive said first actuator to adjust said rpm (Ng) of said transmission to a pregiven first value (Ng1) or to reach a pregiven threshold value (SW1).

14. The system of claim 10, wherein said control means is configured to drive said first actuator, in a further step, to a pregiven second value (Ng2) or to reach a pregiven second threshold value (SW2).

15. The system of claim 9, wherein said control means is so configured that, in a further step, the drive of said first actuator is time controlled.

16. The system of claim 11, wherein said control means is so configured that the drive of said clutch mechanism takes place to adjust a pregiven low value (Ng3) of said transmission rpm.

17. The system of claim 11, wherein said control means is so configured that the drive of said clutch mechanism takes place to control said transmission rpm (Ng) to a pregiven low value (Ng3).

* * * * *

UNITED STATES PATENT AND TRADEMARK OFFICE
CERTIFICATE OF CORRECTION

PATENT NO. : 5,896,963
DATED : April 27, 1999
INVENTOR(S) : Christian Schwientek It is certified that error appears in the above-identified patent and that said Letters Patent is hereby corrected as shown below:

In column 3, line 32: delete "drawing" and substitute -- drawings -- therefor.

In column 3, line 39: delete "EMBODIMENT" and substitute -- EMBODIMENTS -- therefor.

In column 5, line 39: delete "driver" and substitute -- driven -- therefor.

In column 6, line 45: delete "or" and substitute -- of -- therefor.

In column 6, line 59: delete "moor" and substitute -- motor -- therefor.

In column 6, line 60: delete "rotor" and substitute -- motor -- therefor.

In column 7, line 2: delete "near" and substitute -- gear -- therefor.

In column 7, line 8: delete "sear" and substitute -- gear -- therefor.

Signed and Sealed this

First Day of May, 2001

Attest:

NICHOLAS P. GODICI

Attesting Officer

Acting Director of the United States Patent and Trademark Office